(12) United States Patent
Tabacchi

(10) Patent No.: US 7,611,240 B2
(45) Date of Patent: Nov. 3, 2009

(54) FRAME FOR SPECTACLES HAVING ARMS THAT CAN BE OPENED OUT RESILIENTLY

(75) Inventor: Vittorio Tabacchi, Pieve Di Cadore (IT)

(73) Assignee: Safilo Societa Azionaria Fabbrica Italiana Lavorazione Occhiali, Pieve Di Cadore (IT)

( * ) Notice: Subject to any disclaimer, the term of this patent is extended or adjusted under 35 U.S.C. 154(b) by 317 days.

(21) Appl. No.: 11/663,235

(22) PCT Filed: Sep. 27, 2004

(86) PCT No.: PCT/IT2004/000523

§ 371 (c)(1),
(2), (4) Date: Mar. 19, 2007

(87) PCT Pub. No.: WO2006/035461

PCT Pub. Date: Apr. 6, 2006

(65) Prior Publication Data

US 2008/0094569 A1    Apr. 24, 2008

(51) Int. Cl.
*G02C 5/16* (2006.01)
*G02C 5/22* (2006.01)
(52) U.S. Cl. .................. 351/113; 351/111; 351/153
(58) Field of Classification Search .................. 351/113, 351/114, 153, 111, 115, 158, 41; 16/228
See application file for complete search history.

(56) References Cited

U.S. PATENT DOCUMENTS 3,034,402 A * 5/1962 Umberto .................. 351/113
4,818,093 A * 4/1989 Tabacchi .................. 351/113

FOREIGN PATENT DOCUMENTS

| DE | 21 26 898 | 11/1972 |
| DE | 90 02 858 | 7/1991 |
| EP | 1 178 348 | 2/2002 |
| FR | 2 718 537 | 10/1995 |
| GB | 830 759 | 3/1960 |
| GB | 1 557 407 | 12/1979 |
| GB | 2 087 094 | 5/1982 |

OTHER PUBLICATIONS

International Search Report for PCT/IT2004/000523 dated Mar. 10, 2005.

* cited by examiner

*Primary Examiner*—Hung X Dang
(74) *Attorney, Agent, or Firm*—RatnerPrestia

(57) ABSTRACT

A frame for spectacles having arms that can be opened out resiliently includes at least one lug and at least one arm which is articulated to the lug by a tie rod hinged to the lug and slidingly associated with the arm, a resilient device is active between the arm and the tie rod in order to urge the arm towards the lug. The resilient device includes at least one helical spring extending along a substantially longitudinal axis (K), corresponding to the direction of application of the resilient urging, and axes (L) of the turns of the spring are inclined with respect to the longitudinal axis (K) in order to confer on the spring a substantially flattened configuration transverse to the longitudinal axis.

20 Claims, 4 Drawing Sheets

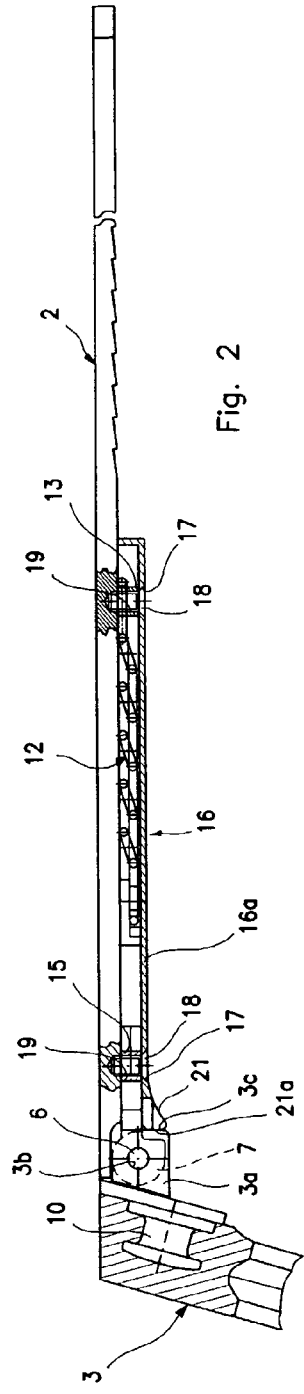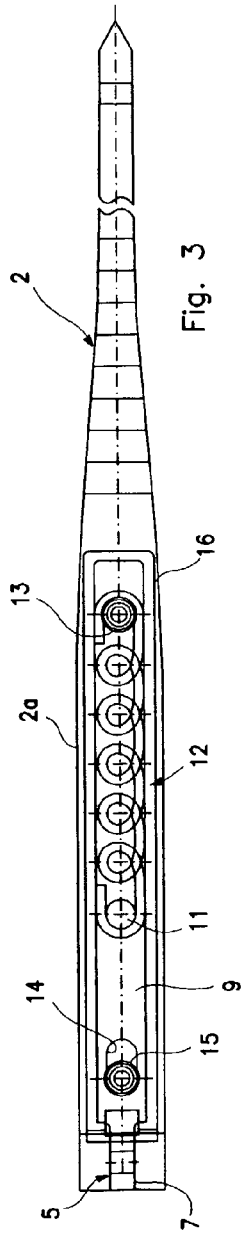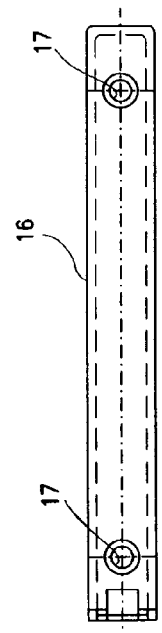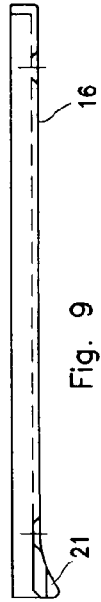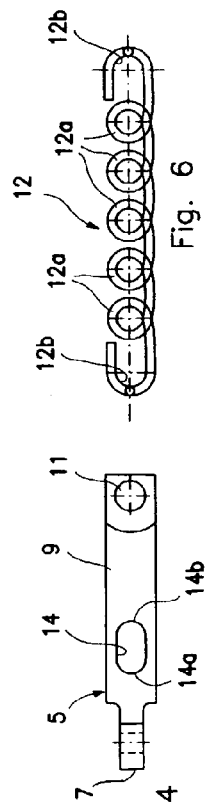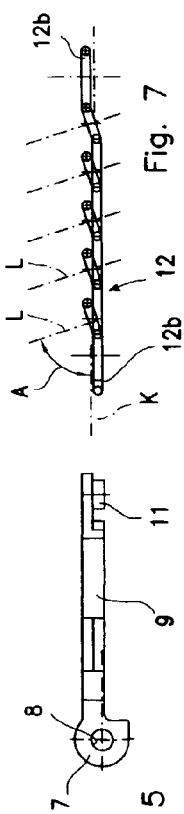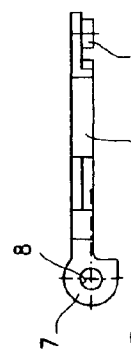

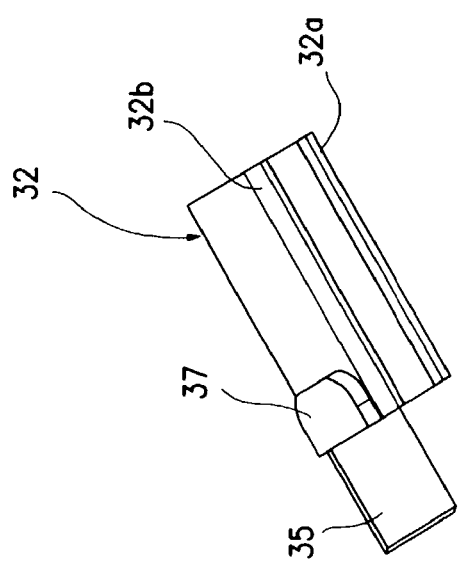
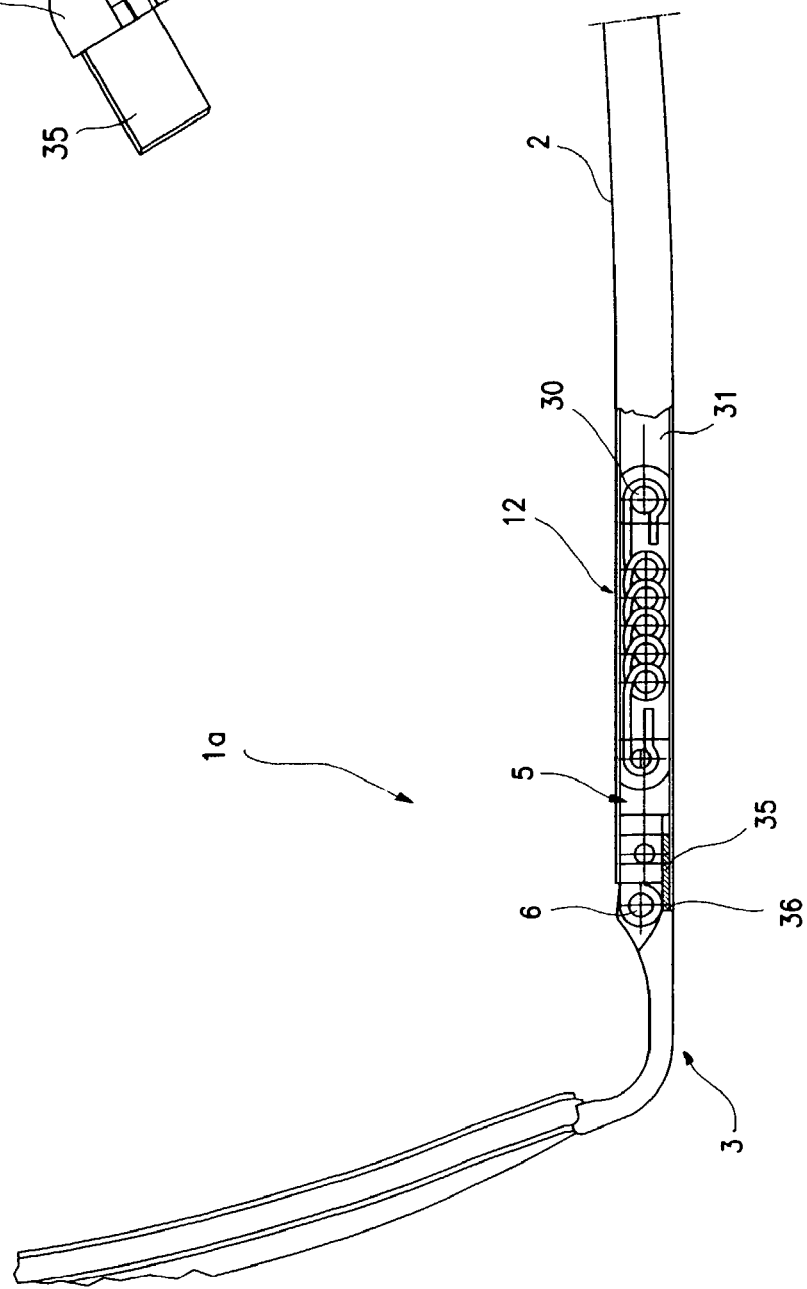

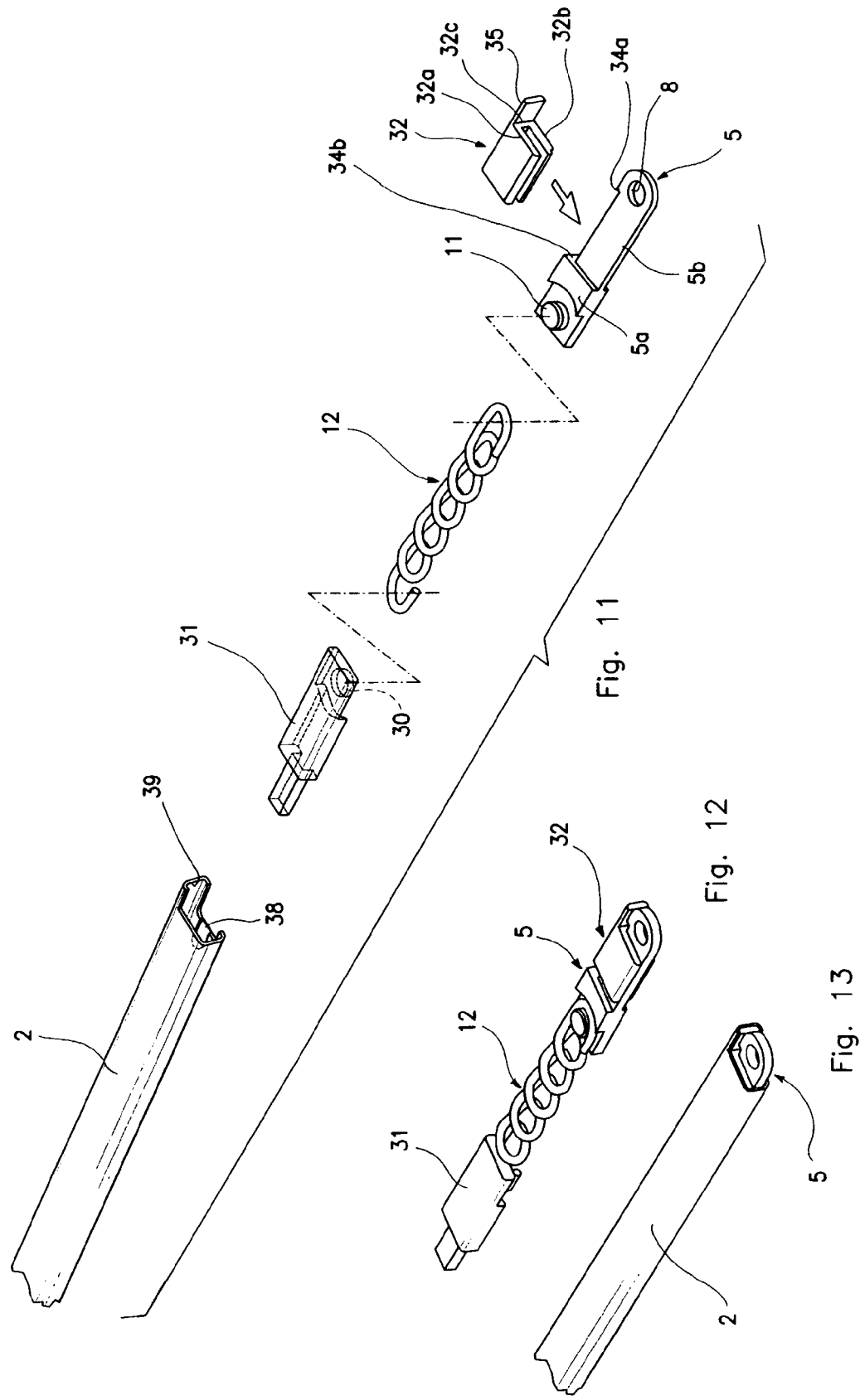

FRAME FOR SPECTACLES HAVING ARMS THAT CAN BE OPENED OUT RESILIENTLY

This application is a U.S. National Phase Application of PCT International Application PCT/IT2004/000523 which is incorporated by reference herein.

TECHNICAL FIELD

The present invention relates to a frame for spectacles, and more particularly to a frame having arms that can be opened out resiliently.

TECHNOLOGICAL BACKGROUND

The invention is applicable in the specific field of spectacle frames provided with systems for articulating the arms, by means of which the arms can be pivoted beyond the normal opening position, although they can be returned to that position when released.

In this field it is known to produce frames that are typically provided with a tie rod, which is hinged to the articulation lug of the arms and associated slidingly with the arm, and with a spring which is active between the tie rod and the arm.

A principal limitation found in the known solutions resides in the major space requirement at the location of the arm, owing to the presence of the sprung articulation device, which is incompatible with the requirements of slenderness which characterise light-weight frames having thin arms.

BRIEF DESCRIPTION OF THE INVENTION

The primary object of the present invention is to provide a frame for spectacles having arms that can be opened out resiliently, which is designed structurally and functionally to overcome the above-mentioned limitations and which is in particular distinguished by arms having a modest space requirement and reduced thickness.

That object and others too, which are demonstrated hereinafter, are achieved by the invention by means of a frame for spectacles which has arms that can be opened out resiliently. The frame comprises at least one lug and at least one arm which is articulated to the lug by a tie rod hinged to the lug and slidingly associated with the arm. Resilient means are active between the arm and the tie rod to urge the arm towards the lug. The resilient means comprises at least one helical spring extending along a substantially longitudinal axis (K), corresponding to the direction of application of the resilient urging, and axes (L) of the turns of the spring are inclined with respect to the longitudinal axis (K) to confer on the spring a substantially flattened configuration transverse to the longitudinal axis.

BRIEF DESCRIPTION OF THE DRAWINGS

The features and advantages of the invention will become clearer from the following detailed description of two of its preferred embodiments illustrated by way of non-limiting example with reference to the appended drawings in which:

FIG. 2 is a partly sectioned plan view of a detail of the frame of FIG. 1, FIG. 3 is a partly sectioned side elevational view of the detail of FIG. 2, FIGS. 4 and 5 are plan and side elevational views, respectively, of a detail of the frame of the preceding Figures, FIGS. 6 and 7 are plan and side elevational views, respectively, of a further detail of the frame of the preceding Figures, FIGS. 8 and 9 are plan and side elevational views, respectively, of a further detail of the frame of the preceding Figures, FIG. 10 is a partial plan view of a second embodiment of a frame according to the invention, FIG. 11 is an exploded perspective view of some details of the frame of FIG. 10, FIG. 12 is a perspective view of some details of FIG. 11 partially assembled, FIG. 13 is a perspective view of the details of FIG. 11 in the assembled condition, FIG. 14 is a perspective view of a detail of FIG. 11.

PREFERRED EMBODIMENTS OF THE INVENTION

Figure 1:
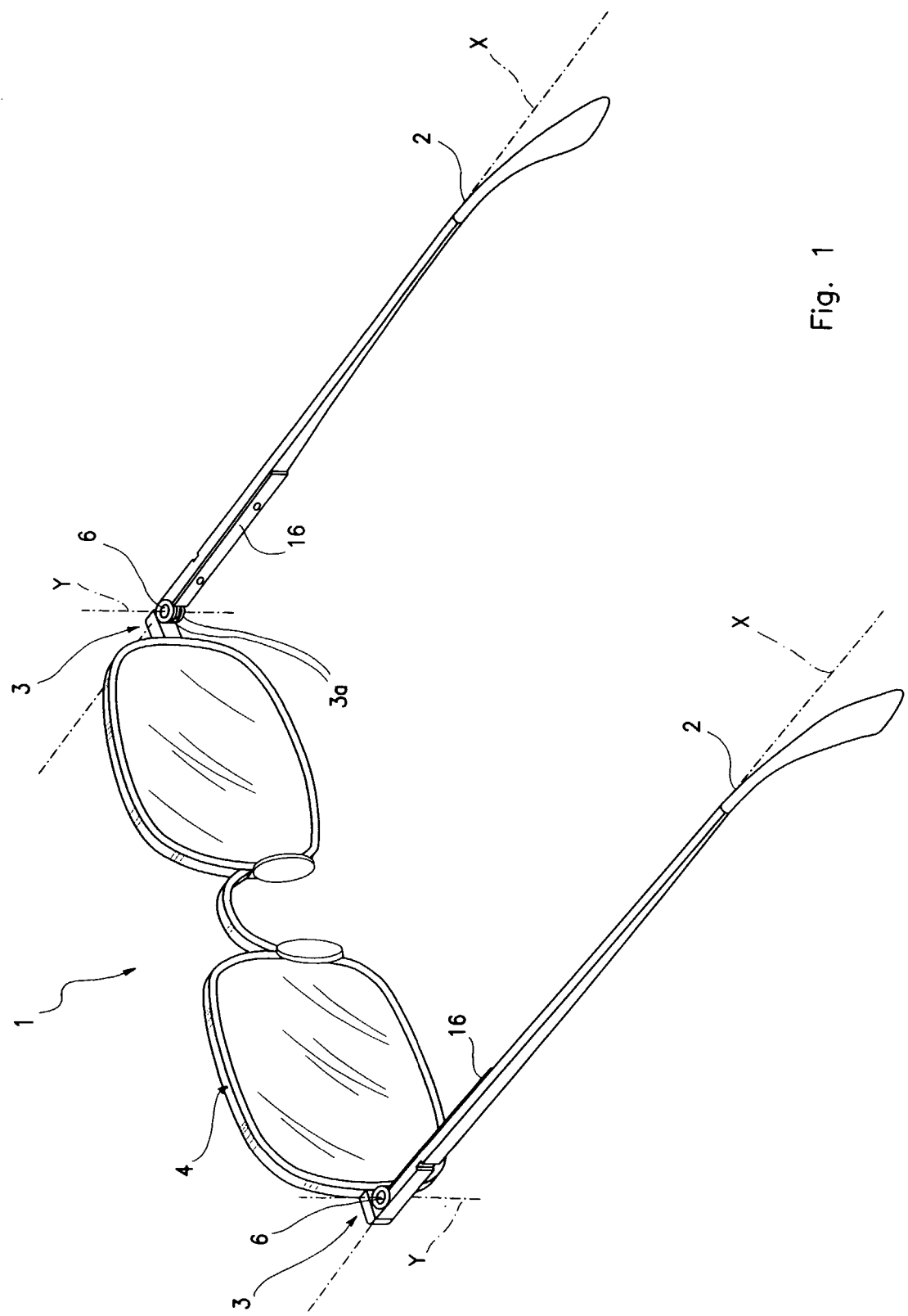
FIG. 1 is a perspective view of a first embodiment of a frame produced in accordance with the present invention.

Referring first of all to FIGS. 1 to 9, a first embodiment of a frame for spectacles having arms that can be opened out resiliently, which is produced in accordance with the present invention, is generally indicated 1.

The frame 1 comprises arms 2 which have a longitudinal axis X and which are articulated to respective lugs 3 of a front mount, generally indicated 4.

The system for the resilient hinging of only one of the arms 2 will be described hereinafter, it being understood that the other, reflectively symmetrical, arm is articulated in a structurally and functionally identical manner.

A tie rod element 5 is hinged to the lug 3 by means of a screw pin 6 having an axis Y substantially perpendicular to the axis X. The tie rod 5 comprises a head 7, which is provided with a through-hole 8 for accommodating the pin 6, and a stem 9 extending axially from the head 7. The stem 9 is rod-shaped with a rectangular cross-section and is slidingly associated with the arm 2, as will emerge in more detail hereinafter.

For the hinged articulation of the tie rod 5 by means of the pin 6, the lug 3 is provided with two respective plate-shaped wings 3a which extend from the lug in parallel and in a spaced manner in order to accommodate the head 7 therebetween. The wings are traversed by respective holes 3b which are coaxial with each other and with the hole 8 in the head when the head is hinged to the lug. One of the holes 3b is advantageously threaded for the screw engagement of the screw pin 6. It is provided that the wings 3a are produced integrally in the front mount 4 or are part of a separate hinge element 10 arranged to be secured to the front, for example, by being let into the front, as shown in FIG. 2.

At the end of the stem 9 axially opposite the head, the tie rod 5 is provided with a pin formation 11 for the coupling of one axial end of a helical spring indicated 12 whose opposite end is constrained on the arm 2.

The spring 12 is of the helical type and extends in a substantially longitudinal direction, identified by the axis K shown in the drawings. The spring 12 is produced preferably in metal wire and comprises a plurality of turns 12a which have, in accordance with a main feature of the invention, respective turn axes which are parallel with one another and are all indicated L and which are inclined with respect to the axis K, with definition of an angle A between the axes K and L. Owing to that inclination, the turns 12a confer on the spring 12 a substantially flattened overall configuration, as shown in FIG. 7, transverse to the axis K.

The spring 12 therefore appears to be "squashed" in a lateral direction so that it has, in that direction, a transverse space requirement which is smaller than that of a conventional helical spring having the same wire diameter and the same turn diameter.

At the opposite axial ends of the spring 12, the corresponding turns are bent to assume a configuration having an open eyelet portion 12b capable of engagement in the respective coupling formations provided in the tie rod and in the arm. It will be appreciated that the axes of the eyelet portions 12b are parallel with each other and are directed perpendicularly to the longitudinal axis K of the spring.

The spring 12 is associated with the arm in a portion 2a of the latter near the lug 3, and is secured to the arm in a position placed against it with the turns facing it in order to obtain an overall lateral space requirement of the arm portion 2a which is extremely small owing to the flattened configuration of the spring 12, as can be seen clearly from FIG. 2.

The arm portion 2a may advantageously be produced in metal material arranged to be connected to the remaining arm part in plastics material. Alternatively, the entire arm 2 may be produced in metal material.

In order to lock the corresponding end of the spring 12 to the arm 2, a respective bush 13 is provided which rises transversely from the arm and which is in coupled engagement in the corresponding end eyelet 12b of the spring.

The cylindrical bush 13 can be secured to the arm, for example by welding, or it can be produced integrally with the arm by moulding.

A slot-form opening 14 is formed through the stem 9, in an intermediate portion of the latter between the head 7 and the pin 11. The slot 14 extends in the axial direction of the stem and has opposite ends 14a, 14b. A further cylindrical bush 15 rising laterally from the arm is engaged in the slot 14 in such a manner that it can slide to a limited extent. The cylindrical bush 15 can be secured to the arm, for example by welding, or can be produced integrally with the arm by moulding. By the engagement of the bush 15 in the slot 14, the tie rod is axially slidable relative to the arm and the end 14b of the slot acts as a means for limiting the pivoting of the arm 2 beyond the normal opening position.

A box-shaped casing, generally indicated 16, for containing the spring 12 and part of the tie rod 5 is also provided and is rigidly fixed to the arm 2. The casing 16 is arranged to be closed by the internal lateral wall of the arm 2 and has, in a base 16a thereof opposite the above-mentioned wall of the arm, a pair of through-holes 17 for the passage of corresponding screws 18 suitable for being screwed into respective threaded holes 19 formed axially in the corresponding bushes 13 and 15. The casing 16 is constrained rigidly on the arm 2 by means of the screws 18.

It will be appreciated that the casing 16 has a lateral space requirement contained within the lateral projection of the space requirement of the corresponding arm 2 so that it is invisible from outside the arm (FIG. 3). The casing 16 is also selected to have dimensions such as to accommodate the tie rod 5 with a limited coupling clearance in order to guide it slidingly in the axial direction.

The casing 16 is also provided with a pair of feet 21 located at the end facing the head 7 in a symmetrical manner with respect thereto. The feet 21 extend in the direction perpendicular to the hinge axis Y and have flat surfaces 21a suitable for locating respective cam profiles 3c defined on the lug 3. The cam profiles 3c are preferably formed on the edge of the respective wings 3a. The feet 21, which are preferably produced integrally with the box-shaped casing 16, are used to increase the contact surface of the casing with the wings 3a in order to permit correct rotation of the arm about the hinge axis.

During the assembly of the frame 1, the spring 12 is pre-loaded resiliently to cause it to be extended and is coupled by its respective ends to the arm and to the tie rod. The arm 2, complete with the tie rod and the box-shaped casing, is then connected to the front mount 4 by inserting the screw pin 6 into the device for the hinged articulation of the arm, and the casing 16 is fixedly joined to the arm by the screws 18. In that condition, the bush 15 abuts the end 14a of the slot 14 and the resilient pre-loading induced in the spring 12 confers resilient behaviour on the device for hinging the arm. The resilient return of the spring 12 to assume the initial resting length is transferred to the hinged articulation, ensuring in the arm 2 a "resilient snap" rotational movement both in respect of closing and in respect of opening. In addition, the arm 2 is provided with the ability to open out resiliently beyond the normal opening position by rotating through an additional angle, the size of which is determined by the extension of the slot 14 and in particular by the position of the ends 14a,b of the slot. When the arm 2 is pivoted beyond the normal opening position, following the locating of the end of the arm with the lug, the arm and the tie rod slide relative to each other with a consequent further lengthening of the spring 12, which brings about an additional resilient force which is such as to return the arm to the normal opening position when it is released.

The components of the frame 1, unless otherwise specified, are advantageously produced in metal material or in a metal alloy, or in plastics material or in another suitable material.

Referring to FIGS. 10 to 14, 1a indicates a second embodiment of a frame produced in accordance with the invention in which components analogous to those of the previous embodiment are represented with the same reference numerals.

The frame 1a differs principally owing to the provision of a tubular or partially tubular structure for each of the arms 2, whose cavity defined on the inside thereof constitutes a seat for accommodating the spring and the tie rod.

In more detail, the part of the arm 2 containing the spring device has a tubular structure with a substantially rectangular cross-section, which is advantageously dimensioned to accommodate with reduced clearance the spring 12 having the same squashed configuration as that described in the previous embodiment.

In a preferred embodiment, the arm is constituted by a tubular structure having a substantially rectangular cross-section and a length sufficient to contain the spring device, on which tubular structure a terminal arm part constituted by a solid member is secured.

Alternatively, the arm may be constituted by a tubular structure over the entire length from the hinge region to the terminal part.

The axial end of the spring 12 more remote from the lug is coupled to a pin formation 30 projecting from a spring support 31 arranged to be accommodated slidingly in the tubular cavity of the arm 2 and fixedly secured thereto in a selected position during the assembly of the frame, for example, by means of welding or screwing. The opposite end of the spring 12, next to the lug 3, is coupled to a pin formation 11 provided at the end of the tie rod element 5. The pin formation 11 is formed in a first portion 5a of the tie rod 5, which portion is suitable for being slidingly guided in the tubular cavity of the arm 2 and is extended by a second portion 5b having a likewise rectangular cross-section but having reduced dimensions compared with the cross-section of the portion 5a. The second portion 5b terminates in a suitably rounded end provided with a through-hole 8 for hinging to the lug 3. Also engaged on the second tie-rod portion 5b, in an axially sliding manner, is a guide element 32 with a U-shaped cross-section having opposite wings 32a, 32b between which the second tie-rod portion is accommodated. Opposite surface projections extending from the same side of the portion 5b and indicated 34a, 34b are positioned in such a manner as to interfere with a portion 32c of the guide 32 which connects the wings 32a, 32b. The projections thus constitute means for limiting the axial sliding of the guide 32 and the tie rod relative to each other.

An appendage 35 also extends axially from the guide 32, as a lengthening of the portion 32c, towards a corresponding abutment surface 36 of the lug and is used to locate the lug when the arm 2 is pivoted beyond the normal opening position.

The guide element 32 is also provided with a projection 37 which rises transversely from the wing 32b and which is capable of engaging a respective seat 38 formed at the end of the arm 2 next to the lug, in order to hold and lock the guide 32 in a centred manner on the arm. The arm is also shaped at the above-mentioned end to define a protruding portion 39 arranged to accommodate the appendage 35 in a substantially form-fitting manner.

During the assembly of the frame 1a, the guide 32 is slidingly connected to the tie rod beforehand, the spring 12 is coupled to the pin 11 of the tie rod and to the pin 30 of the support and the assembly formed by those elements is inserted into the tubular arm 2.

The spring 12 is then pre-loaded to cause it to be extended by axial movement of the support 31 relative to the arm and subsequent locking together, for example, by welding or screwing. The arm 2, complete with the tie rod, the guide, the spring and the support, is connected to the front mount 4 by inserting the hinge pin 6 into the device for the articulation of the arm. The guide 32 is also fixedly joined to the tubular structure of the arm. In that condition, the guide 32 abuts the projection 34a of the tie rod and the resilient pre-loading brought about in the spring confers the resilient behaviour on the device.

The resilient return of the spring 12 to assume the initial resting length is transferred to the hinged articulation and the arm is provided with the ability to open out resiliently beyond the normal opening position, by rotation through an additional angle whose size is determined by the axial travel of the guide and the tie rod relative to each other, towards the opposite projection 34b, which thus acts as a means of limiting the additional pivoting of the arm. When the arm 2 is pivoted beyond the normal opening position, following the locating of the appendage 35 with the lug 3, the tie rod and the guide slide relative to each other (as to also the tie rod and the arm as a consequence) with resultant further lengthening of the spring 12, which produces an additional resilient force for returning the arm to the normal opening position when it is released.

It will be appreciated that, in this second embodiment of the frame as well, the arm 2 has, at least in one direction, an extremely small lateral space requirement associated principally with the squashed configuration of the spring 12. Furthermore, owing to the tubular configuration of the arm, the assembly formed by all of the components of the resilient hinging device can be nested inside the arm, thus limiting the external space requirement to the benefit of the slenderness of the arm. Not least there is the advantage of obtaining a high overall lightness of the arm which is due in particular to the tubular structure thereof.

The invention thus achieves the proposed objects, obtaining the above-mentioned advantages over the known solutions.

Particular mention may be made of the reduction in the space requirement and, in particular, in the thickness of the arms in frames according to the invention, and consequently the production of frames having arms that can be opened out resiliently that are more slender and lighter overall compared with the known solutions.

The invention claimed is:

1. A frame for spectacles having arms that can be opened out resiliently, comprising at least one lug and at least one arm which is articulated to the lug by a tie rod hinged to the lug and slidingly associated with the arm, resilient means being active between the arm and the tie rod to urge the arm towards the lug, and the resilient means comprise at least one helical spring extending along a substantially longitudinal axis (K), corresponding to the direction of application of the resilient urging, and axes (L) of the turns of the spring being inclined with respect to the longitudinal axis (K) to confer on the spring a substantially flattened configuration transverse to the longitudinal axis.

2. The frame according to claim 1, wherein the longitudinal axis (K) of the spring is substantially parallel with the direction of the axial extension of the corresponding arm, and arm portion affected by the spring having an overall transverse space requirement which is reduced owing to the flattened configuration of the spring.

3. The frame according to claim 2, wherein the spring has opposite axial ends constructed as eyelet portions for engaging respective coupling formations provided in the tie rod and in the arm.

4. The frame according to claim 2, wherein the tie rod comprises a head arranged for hinging to the lug, and a stem extending from the head and having a slot-form opening, the opening being engaged by a bush element, rising transversely from the arm, in such a manner that the bush element can slide to a limited extent, one of the opposite ends of the slot-form opening constituting means for limiting the pivoting permitted to the arm beyond the normal opening position.

5. The frame according to claim 1, wherein the spring has opposite axial ends constructed as eyelet portions for engaging respective coupling formations provided in the tie rod and in the arm.

6. The frame according to claim 5, wherein axes of the eyelet portions are directed in parallel with each other and perpendicularly to the longitudinal axis (K) of the spring.

7. The frame according to claim 1, wherein the spring is produced in metal wire.

8. The frame according to claim 1, wherein the tie rod comprises a head arranged for hinging to the lug, and a stem extending from the head and having a slot-form opening, the opening being engaged by a bush element, rising transversely from the arm, in such a manner that the bush element can slide to a limited extent, one of the opposite ends of the slot-form opening constituting means for limiting the pivoting permitted to the arm beyond the normal opening position.

9. The frame according to claim 8, comprising a box-shaped casing for accommodating the spring, which casing is arranged to be fixedly joined to the arm by means of a pair of through-holes engaged by a first screw element and a second screw element which are secured to the arm.

10. The frame according to claim 9, wherein the first screw element is screw-engaged in the bush element.

11. The frame according to claim 9, wherein the end of the spring remote from the tie rod is coupled to the second screw element.

12. The frame according to claim 11, wherein the end of the spring remote from the tie rod is coupled to a second bush element which rises transversely from the arm and in which the second screw element is screw-engaged.

13. The frame according to claim 9, wherein the box-shaped casing is provided with feet and abuts the lug at the location of surfaces of the feet that are capable of locating respective cam profiles of the lug.

14. The frame according to claim 13, wherein the feet extend symmetrically with respect to the head, and the cam profiles are defined on an edge of respective wings extending from the lug, the wings being capable of accommodating the head when the latter is hinged to the lug.

15. The frame according to claim 1, wherein the spring has a flattened configuration in the direction transverse to an axis (Y) for hinging the arm to the lug.

16. The frame according to claim 1, wherein the arm has at least one portion having a tubular structure, and the spring being accommodated axially in a cavity of the arm portion.

17. The frame according to claim 16, wherein the tie rod is guided slidingly in the tubular cavity of the arm.

18. The frame according to claim 16, wherein the tie rod comprises a portion engaged in such a manner that it can slide to a limited extent in a guide element fixedly joined to the arm.

19. The frame according to claim 18, wherein there are provided on said portion of the tie rod a pair of projections which are axially opposed and which are capable of interfering with the guide element to constitute means for limiting the axial sliding of the tie rod and the guide element relative to each other.

20. The frame according to claim 16, wherein a support is provided for coupling the end of the spring that is more remote with respect to the lug to the tubular portion of the arm, the support being constrained on the arm by welding or by screwing.

* * * * *